US008159567B2

(12) United States Patent
Sugisawa et al.

(10) Patent No.: US 8,159,567 B2
(45) Date of Patent: Apr. 17, 2012

(54) IMAGE PROCESSING APPARATUS AND IMAGE PROCESSING METHOD

(75) Inventors: Hiroshi Sugisawa, Kanagawa (JP); Toshio Sarugaku, Chiba (JP); Tomoya Yano, Kanagawa (JP)

(73) Assignee: Sony Corporation (JP)

( * ) Notice: Subject to any disclaimer, the term of this patent is extended or adjusted under 35 U.S.C. 154(b) by 564 days.

(21) Appl. No.: 12/309,913

(22) PCT Filed: Jul. 31, 2007

(86) PCT No.: PCT/JP2007/064954
§ 371 (c)(1), (2), (4) Date: Jan. 30, 2009

(87) PCT Pub. No.: WO2008/016036
PCT Pub. Date: Feb. 7, 2008

(65) Prior Publication Data

US 2009/0244330 A1 Oct. 1, 2009

(30) Foreign Application Priority Data

Jul. 31, 2006 (JP) ................................ P2006-207445

(51) Int. Cl.
*H04N 5/217* (2006.01)

(52) U.S. Cl. ........................................ 348/241; 348/254

(58) Field of Classification Search ............... 348/229.1, 348/230.1, 241, 250, 252, 254, 362–365
See application file for complete search history.

(56) References Cited

U.S. PATENT DOCUMENTS 6,144,364 A 11/2000 Otobe et al.
6,970,148 B2 11/2005 Itoh et al.
2004/0160577 A1 8/2004 Baba et al.
2005/0078069 A1 4/2005 Aiba et al.
2006/0066554 A1 3/2006 Baba et al.
2008/0136752 A1 6/2008 Inoue et al.
2008/0272998 A1 11/2008 Yano et al.

FOREIGN PATENT DOCUMENTS

EP 001662474 A1 5/2006
JP 2001-296841 A 10/2001
JP 2003-022061 A 1/2003
JP 2004-233949 A 8/2004
JP 2006-098803 A 4/2006
WO WO-2006/009106 A1 1/2006
WO 2006-100906 A 4/2006

OTHER PUBLICATIONS

Supplementary European Search Report EP 07791639, dated Aug. 5, 2010.

*Primary Examiner* — Darryl J Collins
(74) *Attorney, Agent, or Firm* — Lerner, David, Littenberg, Krumholz & Mentlik, LLP

(57) ABSTRACT

An image processing apparatus and an image processing method, enabling achievement of both an effect of improvement of motion-picture response and a reduction of flicker even in a case of a low frame rate, are provided. The apparatus has a processing region detection portion 120 including a first detection portion 121 detecting motion of an image in a sub frame from a continuous plurality of sub frames, and a second detection portion 122 detecting a component having a predetermined value or more of level difference to peripheral pixels of pixels forming an image in the sub frame; and a gradation conversion portion 130 including a plurality of adaptive gradation conversion portions 131 and 132 converting the gradation for a region of the component having a level difference at which motion is detected in the corresponding sub frame among the plurality of sub frames in accordance with the output signal of the processing region detection portion 120 and a sub frame selecting and outputting portion 133 alternately selecting and outputting the selectively graduation converted sub frames for each sub frame rate.

6 Claims, 9 Drawing Sheets

IMAGE PROCESSING APPARATUS AND IMAGE PROCESSING METHOD

CROSS-REFERENCE TO RELATED APPLICATIONS

The present application is a national phase entry under 35 U.S.C. §371 of International Application No. PCT/JP2007/064954 filed Jul. 31, 2007, published on Feb. 2, 2008 as WO 2008/016036 A1, and which claims priority from Japanese Patent Application No. JP 2006-207445 filed in the Japanese Patent Office on Jul. 31, 2006, which are incorporated herein by reference.

TECHNICAL FIELD

The present invention relates to, for example, a liquid crystal display device or other such image processing apparatus and an image processing method capable of displaying gradations in response to an input video signal, more particularly, relates to a technique for improving a motion-picture response characteristic.

BACKGROUND ART

As a method of improving a motion-picture response by performing a pseudo impulse display of a liquid crystal display device (hereinafter referred to as an "LCD") performing a hold type display black insertion techniques, such as, black frame insertion, and backlight blinking are being widely used in commercially available LCDs.

However, these techniques involve the problem that the luminance is lowered in response to the raise of the black insertion rate for raising the effect of improvement of the motion-picture response.

Then, as a pseudo impulse display method for improving motion-picture response avoiding the lowering of the luminance (hereinafter referred to as the "improved pseudo impulse drive"), the following techniques have been proposed.

1. Driving a display panel by a high frame rate (for example, 120 Hz) two or more times an ordinary display frame rate (for example, 60 Hz).

2. Carrying out a frame rate conversion from one frame having an ordinary frame rate to a plurality of sub frames having a high frame rate (for example, two sub frames in a case of 60 Hz→120 Hz), and converting the gradations.

Note that, the method of the frame rate conversion may be either a method of production of an interpolation frame or a method of merely copying original frame.

3. Since the gradation conversion is carried out so that the luminance of the frame of a certain pixel before gradation conversion and a mean luminance of a plurality of sub frames after frame rate conversion become the same, a drop in the luminance does not occur.

FIG. 1 is a block diagram showing an example of the configuration of an LCD use image processing apparatus adopting the improved pseudo impulse drive method.

This image processing apparatus 1 has a frame rate conversion portion 2, a gradation conversion portion 3, and a liquid crystal panel 4. The gradation conversion portion 3 includes a first sub frame use first conversion portion 31, a second sub frame use second conversion portion 32, and a sub frame selecting and outputting portion 33.

Here, the improved pseudo impulse drive processing in the image processing apparatus 1 in FIG. 1 will be explained with reference to FIG. 2 to FIG. 5.

FIG. 2 is a diagram showing an output gradation characteristic of a frame before frame rate conversion and gradation conversion by a general hold drive, FIG. 3 is a diagram showing a gradation conversion characteristic, FIG. 4 is a diagram showing an output gradation characteristic of a sub frame after frame rate conversion and gradation conversion in a case where the improved pseudo impulse drive is employed, and FIG. 5 is a diagram showing a transmittance characteristic of the sub frame after frame rate conversion and gradation conversion in the case where the improved pseudo impulse drive is employed.

The results by converting each frame of 60 Hz to a first sub frame and a second sub frame of 120 Hz as shown in FIG. 2, then further converting the gradation of the first and second sub frames according to the characteristics shown by the solid lines A and A' in FIG. 3, are shown in FIG. 4.

Since the response of a liquid crystal at this time becomes a pseudo impulse resembling the impulse waveform as shown in FIG. 5, therefore the liquid crystal motion-picture response due to the hold type display is improved.

DISCLOSURE OF INVENTION

Technical Problem

In the improved pseudo impulse drive, however, since the visual frame rate at a luminance by which the liquid crystal exhibits a pseudo impulse response looks like an ordinary frame rate as shown in FIG. 5, flicker due to the ordinary frame rate occurs.

The more the gradation conversion characteristic approaches to a straight line C as in the characteristics shown by the broken lines B and B' in FIG. 3, the more the flicker decreases and the more the visually perceived flicker is reduced, however, the resultant response of the liquid crystal also returns from the pseudo impulse to the hold direction, therefore, the effect of improvement of the motion-picture response is reduced. In this way, finally, the improvement depends on a trade-off of the reduction of flicker and the effect of improvement of the motion-picture response.

In particular, in the case where an input signal thereof is of a PAL (Phase Alternation by Line) type or other low frame rate, reduction of flicker becomes remarkable, if selecting a gradation conversion characteristic where no reduction of flicker is sensed at all, the effect of improvement of the motion-picture response can no longer be recognized much at all, and achievement of both a reduction of flicker and improvement of the effect of the improved motion-picture response was impossible.

The present invention is to provide an image processing apparatus and an image processing method, enabling achievement of both the effect of improvement of the motion-picture response and the reduction of flicker even in the case of a low frame rate.

Technical Solution

A first aspect of the present invention is an image processing apparatus, capable of displaying a reference image on a display panel, the reference image being defined as an image to be displayed on the display panel, by a predetermined display drive and by an improved pseudo impulse drive which expresses a predetermined one gradation corresponding to the reference image by gradations of different brightness of at least two pictures continuing in time, having: a processing region detection portion outputting an output signal including a motion detection result detecting motion of the image in the reference image from image information before or after the reference image in time, and a level difference detection result detecting a component having a predetermined value or more of level difference to peripheral pixels on a pixel forming an image in the reference image, and an adaptive drive portion detecting motion in the reference image in accordance with the output signal including the motion detection result and the level difference detection result output from the processing region detection portion and adaptively applying the improved pseudo impulse drive to the region at which the level difference is detected.

Preferably, the pictures by the predetermined display drive include at least two continuous pictures having approximately equal brightness.

A second aspect of the present invention is an image processing apparatus outputting an image signal corresponding to one frame of an input video signal formed by a plurality of sub frames, having: a processing region detection portion including a first detection portion detecting motion of an image in a sub frame from the plurality of sub frames continuing in time, and a second detection portion detecting a component having a predetermined value or more of level difference to peripheral pixels on a pixel forming an image in the sub frame, and a gradation conversion portion including a plurality of adaptive gradation conversion portions each converting the gradation for a region of the component having the level difference at which motion in the corresponding sub frame is detected among the plurality of sub frames by the first and second detection portions in accordance with the motion detected value and the detected value of level difference detected at the processing region detection portion and a sub frame selecting and outputting portion selecting and outputting selectively gradation-converted sub frames by switching these sub frames for each sub frame rate.

Preferably, each of the adaptive gradation conversion portions converts the gradation according to a predetermined characteristic corresponding to a brighter level and a darker level than the image signal.

Preferably, the image signal before the conversion by the adaptive gradation conversion portions has approximately equal brightnesses of the plurality of sub frames.

Preferably, the apparatus further has a frame rate conversion portion converting a frame of the input video signal to a plurality of sub frames having a higher rate than this frame and outputting the converted sub frames to the processing region detection portion and the gradation conversion portion.

Preferably, the component, having the predetermined value or more of level difference detected by the second detection portion in the processing region detection portion, is an edge component forming a contour of the image, and each adaptive gradation conversion portion in the gradation conversion portion selectively converts the gradation of the region at which motion was detected at the first detection portion in the sub frame image and detected as an edge component at the second detection portion.

Preferably, the apparatus further has a frame rate conversion portion converting a frame of the input video signal to a plurality of sub frames having a higher rate than this frame, and outputting the converted sub frames to the processing region detection portion and the gradation conversion portion.

A third aspect of the present invention is an image processing method, outputting an image signal corresponding to one frame of an input video signal by a plurality of sub frames, having: a first step of detecting motion of an image in a sub frame from the plurality of sub frames continuing in time, a second step of detecting a component having a predetermined value or more of level difference to peripheral pixels on a pixel forming an image in the sub frame, a third step of converting the gradation for a region of a certain component having the level difference at which motion in the corresponding sub frame is detected among the plurality of sub frames by the first and second steps, and a fourth step of switching and selecting the selectively gradation-converted sub frames for each sub frame rate and outputting the selected sub frame.

According to the present invention, the image processing apparatus is configured so that, when the image to be displayed on the display panel is defined as the reference image, this reference image can be displayed on the display panel by the predetermined display drive and by the improved pseudo impulse drive which expresses a predetermined gradation corresponding to the reference image by gradations having different brightnesses of at least two continuous pictures.

For example, the processing region detection portion detects motion of an image in this reference image from image information before or after the reference image in time. Then, a signal including this detected motion detection result and the level difference detection result detecting a component having a predetermined value or more of level difference to peripheral pixels of pixels forming an image, in the reference image, is output from the processing region detection portion to the adaptive drive portion.

In the adaptive drive portion, the motion in the reference image is detected in accordance with the output signal of the processing region detection portion. Further, the improved pseudo impulse drive is adaptively applied to the region at which the level difference is detected.

Effects of the Invention

According to the present invention, there is the advantage that achievement of both the effect of improvement of the motion-picture response and the reduction of flicker becomes possible even in the case of a low frame rate.

EXPLANATION OF REFERENCES

100 . . . image processing apparatus, 110 . . . frame rate conversion portion, 120 . . . processing region detection portion, 121 . . . motion detection portion (first detection portion), 122 . . . edge detection portion (second detection portion), 123 . . . detection synthesizing portion, 130 . . . gradation conversion portion (adaptive drive portion), 131 . . . first adaptive gradation conversion portion, 132 . . . second adaptive gradation conversion portion, 133 . . . sub frame selecting and outputting portion, and 140 . . . liquid crystal panel.

BEST MODES FOR CARRYING OUT THE INVENTION

Below, an embodiment of the present invention will be explained with reference to the drawings.

An image processing apparatus according to the present embodiment is configured so that, when an image to be displayed on a display panel (for example, a liquid crystal panel) is defined as a reference image, this reference image can be displayed on the display panel by a predetermined display drive and by an improved pseudo impulse drive which expresses a predetermined single gradation corresponding to this reference image in gradations having different brightnesses of at least two pictures continuing in time.

More specifically, the image processing apparatus of the present embodiment does not just adjust the improved pseudo impulse drive to the entire frame image, but, the apparatus detects an edge region of a motion-picture which is a generation source of a blurred feeling at the time of the motion-picture display from inside the frame image, and adaptively applies the improved pseudo impulse drive to only this region, to achieve both the effect of improvement of the motion-picture response and the reduction of flicker even in the case of a low frame rate.

Note that, in the present embodiment, as the improved pseudo impulse drive, the following techniques may be included:

1. Driving the display panel by a high frame rate (for example, 120 Hz) two or more times the ordinary display frame rate (for example, 60 Hz).

2. Carrying out the frame rate conversion from one frame having an ordinary frame rate to a plurality of sub frames having a high frame rate (for example, two sub frames in a case of 60 Hz→120 Hz), and the gradation conversion.

Note that, the method of the frame rate conversion may be either the method of production of an interpolation frame or a merely original frame copying method.

3. Since the gradation conversion is carried out so that the luminance of a frame of a certain pixel before gradation conversion and a mean luminance of a plurality of sub frames after frame rate conversion become the same, a drop of the luminance does not occur.

Below, the configuration and functions of the image processing apparatus corresponding to the improved pseudo impulse drive of 2 described above of the present embodiment will be explained specifically.

Figure 6:
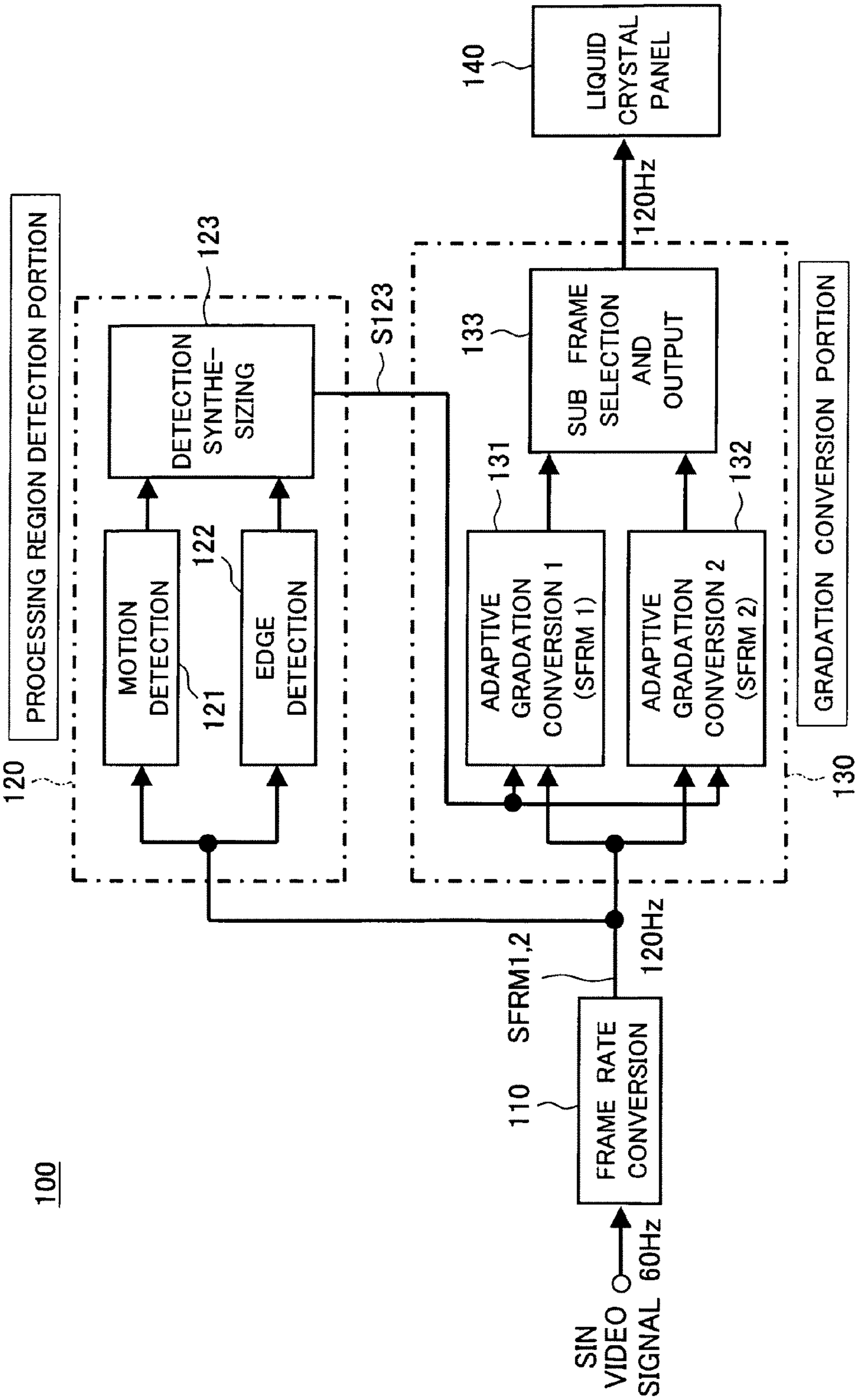
FIG. 6 A block diagram showing an example of the configuration of an image processing apparatus according to an embodiment of the present invention.

FIG. 6 is a block diagram showing an example of the configuration of the image processing apparatus according to an embodiment of the present invention.

An image processing apparatus 100, as shown in FIG. 6, has a frame rate conversion portion 110, a processing region detection portion 120, a gradation conversion portion (adaptive drive portion) 130, and a liquid crystal panel 140.

Note that the frame rate of a video signal SIN input to the image processing apparatus 100 will be explained as 60 Hz, as one example.

The frame rate conversion portion 110 converts a frame of 60 Hz of the input video signal SIN to a first sub frame SFRM1 and a second sub frame SFRM2 of 120 Hz, and outputs the converted results to the gradation conversion portion 130 and the processing region detection portion 120.

Note that the method of the frame rate conversion may be either of the method of production of an interpolation frame by motion detection, or the method of merely original frame copying.

The processing region detection portion 120 has a motion detection portion (first detection portion) 121 which detects motion of a motion-picture in a sub frame from a continuous plurality of sub frames (the first sub frame SFRM1 and the second sub frame SFRM2 in the present embodiment), an edge detection portion 122 (second detection portion) detecting an edge component in a sub frame, and a detection synthesizing portion 123 which synthesizes the motion detection result and the edge detection result and outputs the synthesized result, as a signal S123, to the gradation conversion portion 130. The edge detection portion 122 as the second detection portion detects a component having a predetermined value or more of level difference to peripheral pixels of pixels forming an image in the sub frame to perform edge detection.

Figure 7:
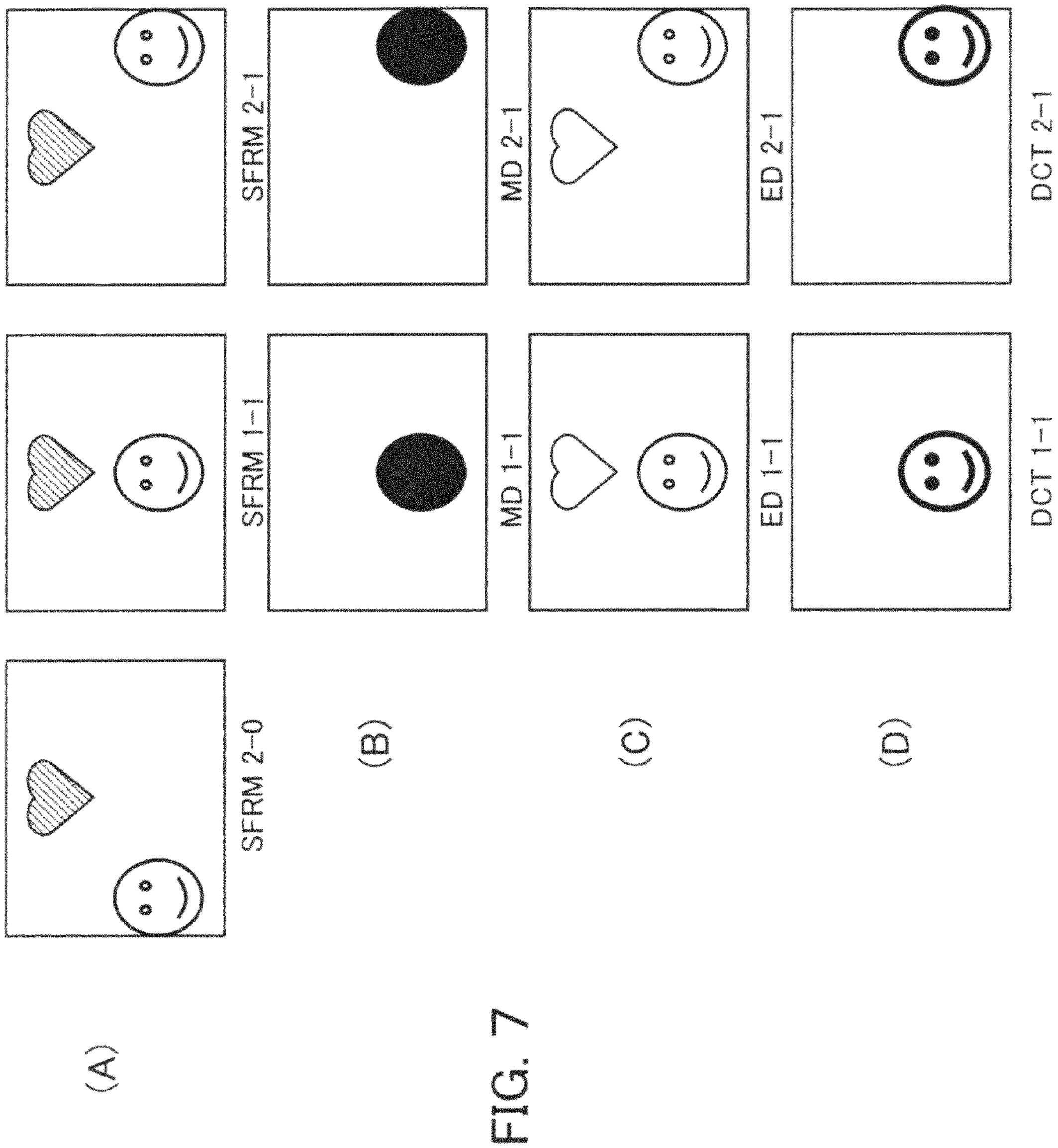
FIG. 7 A diagram for explaining a processing concept of a processing region detection portion according to the present embodiment.

FIG. 7 is a diagram for explaining the processing concept of the processing region detection portion according to the present embodiment.

An outline of the edge region detection method of a motion-picture in a sub frame will be explained using the processing conceptual diagram of the processing region detection portion 120 in FIG. 7.

As shown in FIG. 7(A), assume that a sub frame SFRM2-0, a sub frame SFRM1-1, and a sub frame SFRM2-1, converted to 120 Hz, are input to the processing region detection portion 120.

In the processing region detection portion 120, the motion detection portion 121 detects motion of a motion-picture from the information of sub frames and, as shown in FIG. 7(B), outputs a motion detected result MD1-1 and a motion detected result MD2-1, corresponding to the sub frame SFRM1-1 and sub frame SFRM2-1.

The method of the motion detection at this time may be a motion vector detection method of a block matching method or an inter-frame motion detection method utilizing an inter-frame difference.

The edge detection portion 122 detects an edge in each sub frame and, as shown in FIG. 7(C), outputs an edge detected result ED1-1 and an edge detected result ED2-1, corresponding to the sub frame SFRM1-1 and sub frame SFRM2-1.

The detection synthesizing portion 123 performs the synthesizing of the motion detected result and edge detected result, and various adjustment processing (detection region expansion, detection region rounding, isolated point processing, etc.), as shown in FIG. 7(D), outputs a detection synthesized result DTC1-1 and a detection synthesized result DTC2-1, corresponding to the sub frame SFRM1-1 and sub frame SFRM2-1, as the signal S123 to the gradation conversion portion 130.

That is, the edge region detected results of motion-pictures in sub frames forming a generation source of a blurred feeling at the time of motion-picture display are output from the detection synthesizing portion 123 as the detection synthesized result DCT1-1 and detection synthesized result DCT2-1, these results become the output of the processing region detection portion 120, and are input to the gradation conversion portion 130.

The gradation conversion portion 130 has a first adaptive gradation conversion portion 131 selectively converting the gradation for only an edge region of a motion-picture in the sub frame SFRM1 in accordance with the output signal S123 of the processing region detection portion 120, a second adaptive gradation conversion portion 132 selectively converting the gradation for only an edge region of a motion-picture in the sub frame SFRM2 in accordance with the output signal S123 of the processing region detection portion 120, and a sub frame selecting and outputting portion 133 alternately selecting and outputting the selectively luminance-converted sub frames for each 120 Hz of the sub frame rate.

Figure 1:
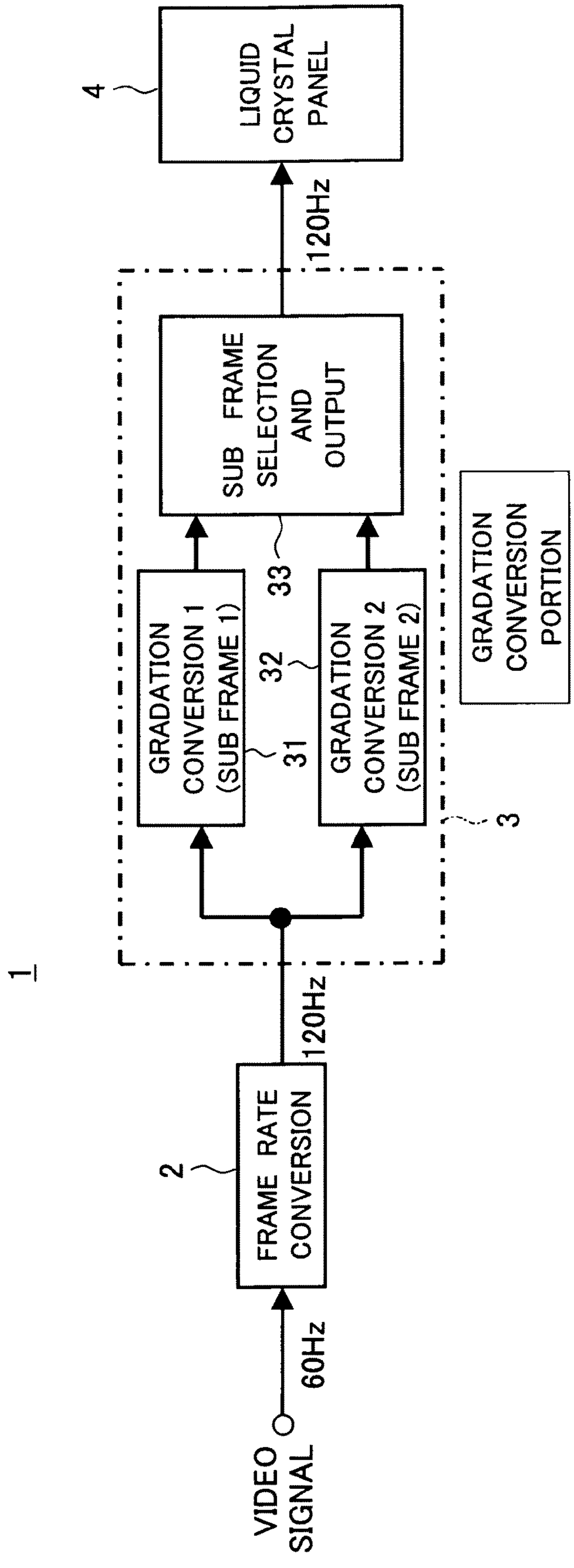
FIG. 1 A block diagram showing an example of the configuration of an LCD use image processing apparatus employing an improved pseudo impulse drive method.
Figure 2:
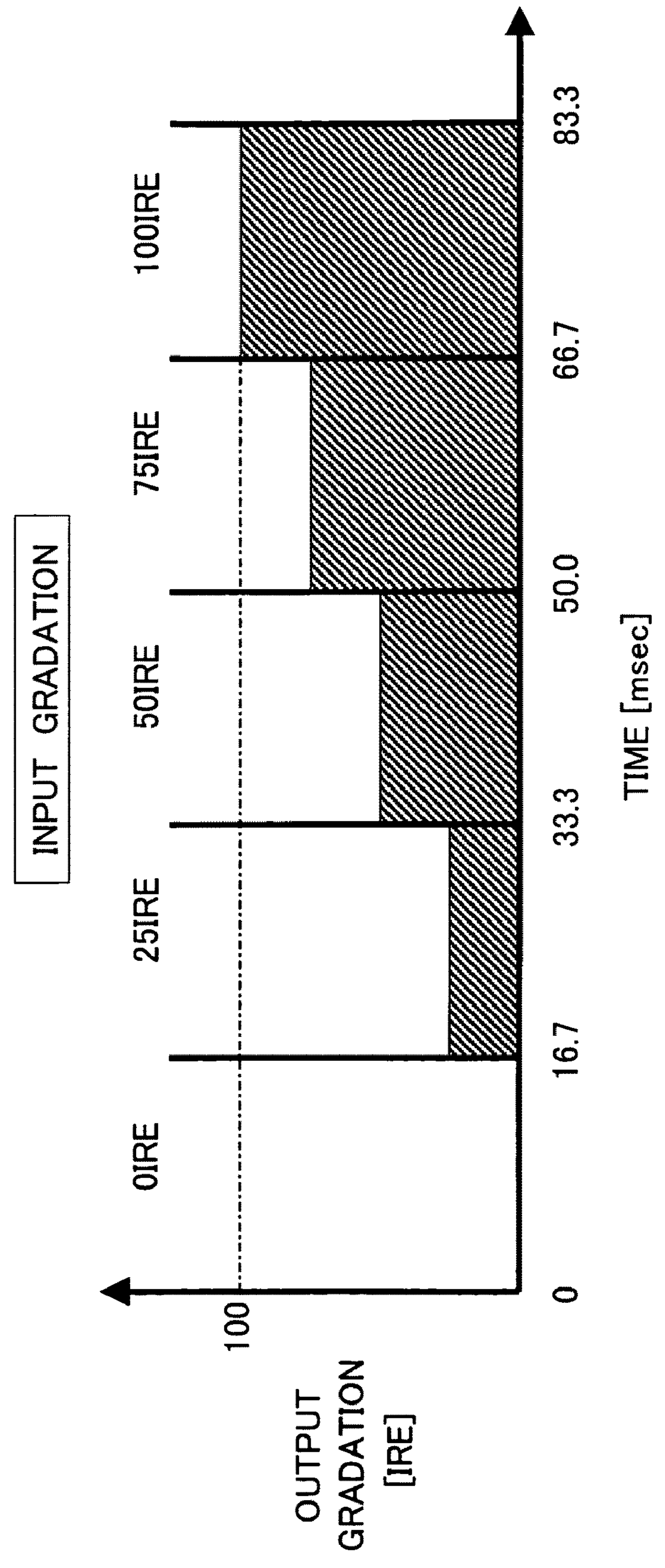
FIG. 2 A diagram showing an output gradation characteristic of a frame before frame rate conversion and gradation conversion of a general hold drive.
Figure 3:
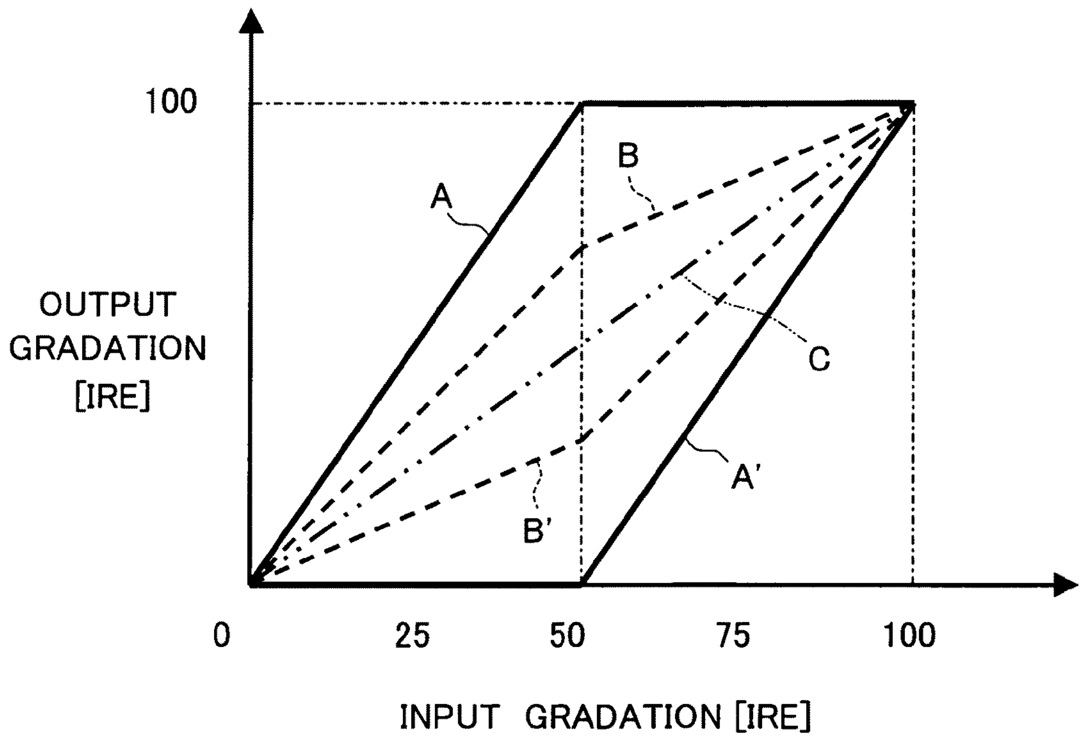
FIG. 3 A diagram showing a gradation conversion characteristic.
Figure 4:
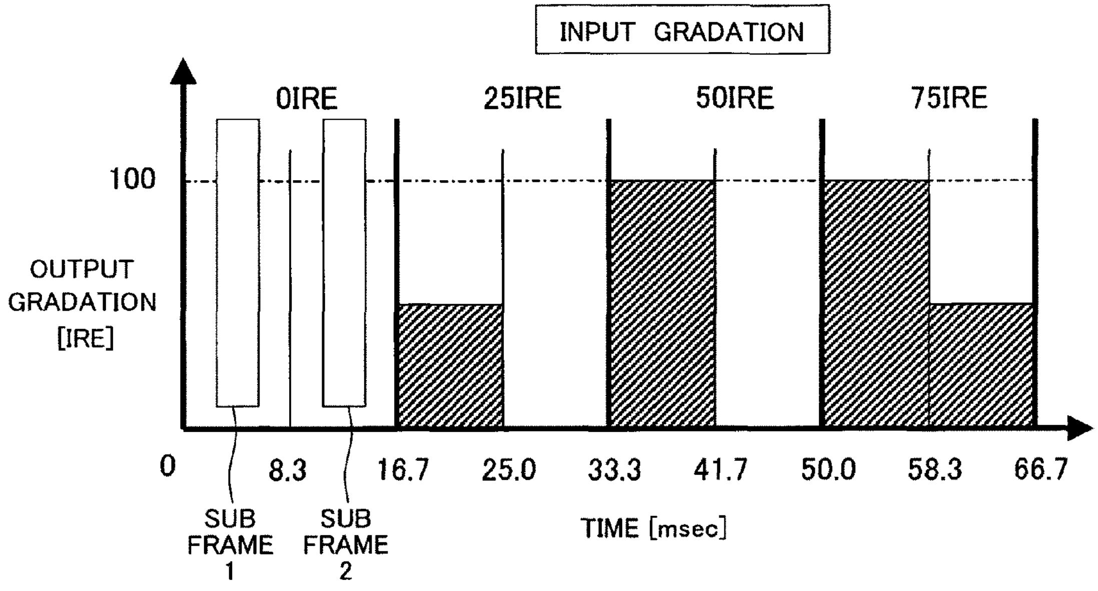
FIG. 4 A diagram showing an output gradation characteristic of sub frames after frame rate conversion and gradation conversion in a case where the improved pseudo impulse drive is employed.
Figure 5:
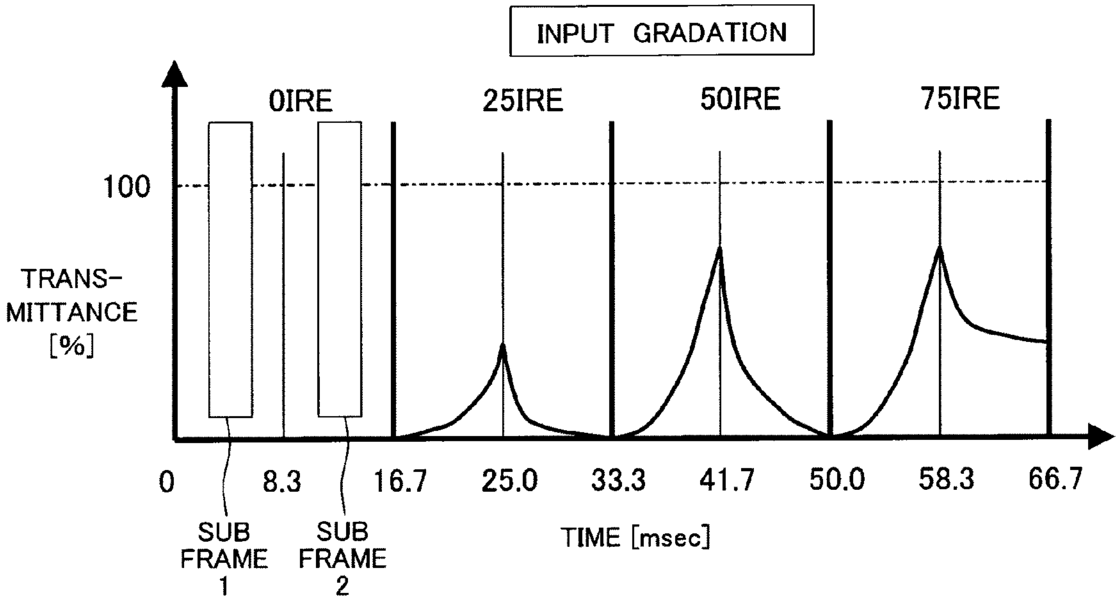
FIG. 5 A diagram showing transmittance characteristics of sub frames after frame rate conversion and gradation conversion in a case where the improved pseudo impulse drive is employed.

In the first adaptive gradation conversion portion 131, the edge region detected result of the motion-picture of the sub frame SFRM1 is received from the processing region detection portion 120, and adaptive processing is carried out so that the gradation conversion according to the characteristic indicated by the solid line A in FIG. 3 is performed for only the detection region (detection synthesized result DCT1-1 of FIG. 7(D)) of the sub frame SFRM1, and the gradation conversion for regions other than the region is not performed.

In the same way, in the second adaptive gradation conversion portion 132, the gradation conversion according to the characteristic indicated by the solid line A' in FIG. 3 for only the detection region (detection synthesized result DCT2-1 of FIG. 7(D)) of the sub frame SFRM2 is performed, and the gradation conversion for regions other than the region is not performed.

Further, the gradation conversion characteristics used in the first and second adaptive gradation conversion portions 131 and 132 are not limited to the characteristics indicated by the solid lines A and A' in FIG. 3, and can be freely set, for example, a characteristic of a non-linear curve expressed by a gamma (v) function may be applied.

Next, the operation by the above configuration will be explained.

First, in the frame rate conversion portion 110, a frame rate conversion from a frame of 60 Hz of the input video signal SIN to sub frames SFRM1 and SFRM2 of 120 Hz is performed.

The sub frames SFRM1 and SFRM2 converted to 120 Hz are input to the processing region detection portion 120 and the gradation conversion portion 130.

In the processing region detection portion 120, the motion detection portion 121 detects motion of motion-pictures in the sub frames from the first sub frame SFRM1 and the second sub frame SFRM2 to sub frames, and the motion detected result is input to the detection synthesizing portion 123.

Further, in the edge detection portion 122, the edge component in the sub frame is detected, and the edge detected result is input to the detection synthesizing portion 123.

Then, in the detection synthesizing portion 123, the motion detected result and edge detected result are synthesized, and the synthesized result is output to the gradation conversion portion 130 as the signal S123.

In the first adaptive gradation conversion portion 131 of the gradation conversion portion 130, the gradation conversion for only the edge region of the motion-picture in the sub frame SFRM1 is selectively performed in accordance with the output signal S123 of the processing region detection portion 120, and the result thereof is input to the sub frame selecting and outputting portion 133.

Further, in the second adaptive gradation conversion portion 132, the gradation conversion for only the edge region of the motion-picture in the sub frame SFRM2 is selectively performed in accordance with the output signal S123 of the processing region detection portion 120, and the result thereof is input to the sub frame selecting and outputting portion 133.

Then, in the sub frame selecting and outputting portion 133, the selectively luminance converted sub frames are alternatively selected for each 120 Hz of the sub frame rate, and the selected frame is output to the liquid crystal panel 140.

Due to this, the sub frames selectively converted in gradation for only the edge region of the motion-picture are sequentially input from the gradation conversion portion 130 to the liquid crystal panel at a frame rate of 120 Hz to display them.

Figure 8:
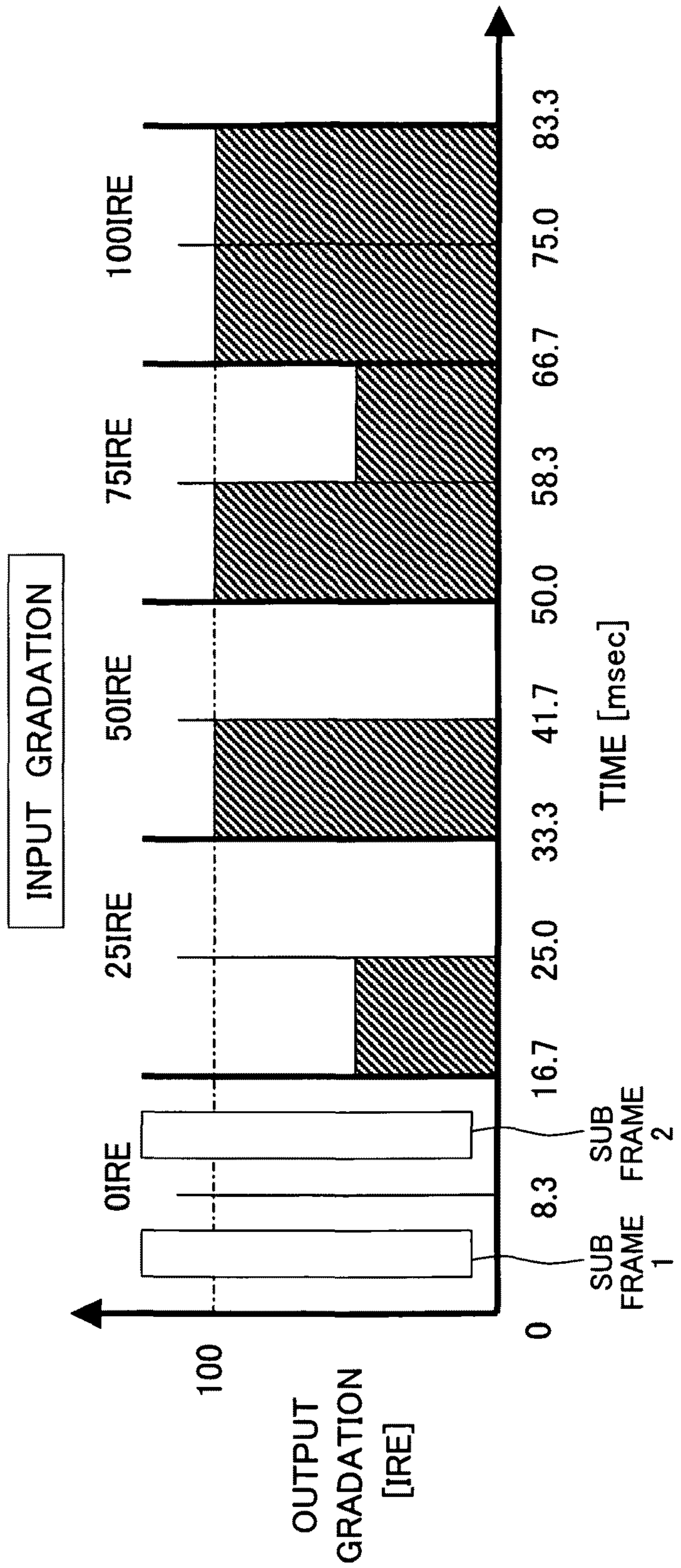
FIG. 8 A diagram showing the output gradation characteristic of sub frames after frame rate conversion and gradation conversion in the case where the improved pseudo impulse drive is employed according to an embodiment of the present invention.
Figure 9:
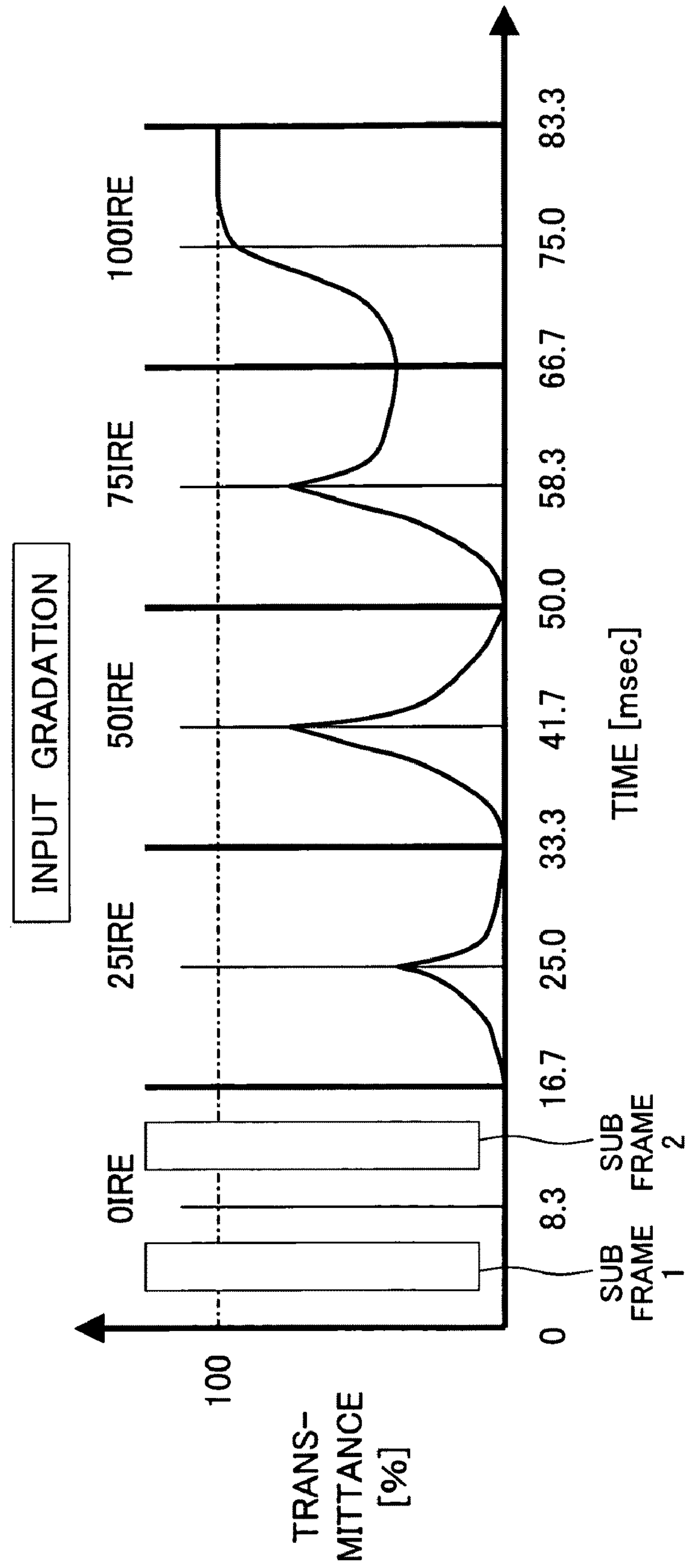
FIG. 9 A diagram showing a transmittance characteristic of sub frames after frame rate conversion and gradation conversion in the case where the improved pseudo impulse drive is employed according to an embodiment of the present invention.

At this time, since the response of the liquid crystal in the edge region of the gradation-converted motion-picture becomes the pseudo impulse, as indicated as 66.7 to 83.3 ms and 100 IRE in FIG. 8 and FIG. 9, the motion-picture response is improved, and regions other than the region become the ordinary hold type display.

That is, in the image processing apparatus 100 of the present embodiment, by adaptively applying the improved pseudo impulse drive, selectively to only the edge region of the motion-picture in the frame image forming the generation source of a blurred feeling at the time of motion-picture display, the effect of improvement of the motion-picture response equivalent to the case where the improved pseudo impulse drive is applied to the whole frame image is kept, while the improved pseudo impulse drive is not adaptively applied to regions other than that region, to thereby reduce flicker.

Due to this, achievement of both the effect of improvement of the motion-picture response and the reduction of flicker in the case of a low frame rate, which was impossible when simply applying the improved pseudo impulse drive to the entire frame image, is accomplished.

As explained above, according to the present embodiment, since there are provided: the frame rate conversion portion 110 converting a frame of 60 Hz of the input video signal SIN to the first sub frame SFRM1 and second sub frame SFRM2 of 120 Hz; the processing region detection portion 120 including the motion detection portion 121 detecting the motion of the motion-picture in the sub frame from the plurality of sub frames continuing in time, the edge detection portion 122 detecting the edge component in the sub frame; and the detection synthesizing portion 123 synthesizing the motion detected result and the edge detected result; and the gradation conversion portion 130 including the first adaptive gradation conversion portion 131 selectively converting the gradation for only the edge region of the motion-picture in the sub frame SFRM1 in accordance with the output signal S123 of the processing region detection portion 120, the second adaptive gradation conversion portion 132 selectively converting the gradation for only the edge region of the motion-picture in the sub frame SFRM2 in accordance with the output signal S123 of the processing region detection portion 120, and the sub frame selecting and outputting portion 133 alternately selecting the selectively luminance converted sub frames for each 120 Hz of the sub frame rate and outputting the selected frame to the liquid crystal panel 140, the following effects can be obtained.

By keeping the effect of improvement of the motion-picture response equivalent to the case where the improved pseudo impulse drive is adaptively applied to the whole frame image, while not adaptively applying the improved pseudo impulse drive to regions other than the region, the reduction of flicker can be accomplished.

Due to this, it is possible to accomplish both the effect of improvement of the motion-picture response and the reduction of the flicker in the case of a low frame rate—which was impossible in the case where the improved pseudo impulse drive was simply adapted to the whole frame image.

In particular, in the case where the input signal is the PAL or other the low frame rate, there is the advantage that achievement of both the effect of improvement of the motion-picture response and the reduction of flicker becomes possible.

Note that, in the above explanation, the explanation was given of a preferred embodiment selectively and adaptively applying the improved pseudo impulse drive to only the edge region of the motion-picture in the frame image serving as the generation source of the blurred feeling at the time of the motion-picture display, but the selective adaptation of region of the improved pseudo impulse drive is not limited to only the edge. It is also possible to configure the apparatus so that, for example, a region having a predetermined level difference not less than the threshold value in the frame image is selectively adapted.

The invention claimed is:

1. An image processing apparatus outputting an image signal corresponding to one frame of an input video signal formed by a plurality of sub frames, comprising:

a processing region detection portion including a first detection portion detecting motion of an image in a sub frame from the plurality of sub frames continuing in time, and a second detection portion detecting a component having a predetermined value or more of level difference to peripheral pixels on a pixel forming an image in the sub frame; and a gradation conversion portion including a plurality of adaptive gradation conversion portions each converting the gradation for a region of a respective component having the level difference at which motion in the corresponding sub frame is detected among the plurality of sub frames by the first and second detection portions in accordance with the motion detected value and the detected value of level difference detected at the processing region detection portion and a sub frame selecting and outputting portion selecting and outputting selectively gradation-converted sub frames by switching these sub frames for each sub frame rate, wherein the apparatus further comprises a frame rate conversion portion converting a frame of the input video signal to a plurality of sub frames having a higher rate than the respective frame and outputting the converted sub frames to the processing region detection portion and the gradation conversion portion.

2. An image processing apparatus as set forth in claim 1, wherein each of the adaptive gradation conversion portions converts the gradation according to a predetermined characteristic corresponding to a brighter level and a darker level than the image signal.

3. An image processing apparatus as set forth in claim 1, wherein the luminance of a certain image at the time, when a plurality of sub frames converted by the adaptive gradation conversion portions are displayed by the improved pseudo impulse drive, is approximately equal to the luminance at the time when one frame of the input signal before the conversion is displayed by the predetermined display drive.

4. An image processing apparatus as set forth in claim 1, wherein the component, having the predetermined value or more of level difference detected by the second detection portion in the processing region detection portion, is an edge component forming a contour of the image, and each adaptive gradation conversion portion in the gradation conversion portion selectively performs the gradation conversion to the region at which motion was detected at the first detection portion in the sub frame image and detected as an edge component at the second detection portion.

5. An image processing apparatus as set forth in claim 4, wherein the adaptive gradation conversion portions perform the gradation conversion according to predetermined characteristics corresponding to a brighter level and a darker level than the image signal.

6. An image processing method outputting an image signal corresponding to one frame of an input video signal by a plurality of sub frames, comprising:

a first step of detecting motion of an image in a sub frame from the plurality of sub frames continuing in time, a second step of detecting a component, having a predetermined value or more of level difference to peripheral pixels on a pixel forming an image in the sub frame, a third step of converting the gradation for a region of a respective component having the level difference at which motion in the corresponding sub frame is detected among the plurality of sub frames by the first and second steps, and a fourth step of switching and selecting the selectively gradation-converted sub frames for each sub frame rate and outputting the selected sub frame, wherein the first step and the second step are performed by a processing region detection portion of an image processing apparatus and the third step and the fourth step are performed by a gradation conversion portion of the image processing apparatus, and wherein the method further comprises converting a frame of the input video signal to a plurality of sub frames having a higher rate than the respective frame and outputting the converted sub frames to the processing region detection portion and the gradation conversion portion.

* * * * *